No. 738,242. PATENTED SEPT. 8, 1903.
L. ROMERO & E. RODRIGUEZ-Y-ARCE.
APPARATUS FOR PRODUCING AND PREPARING CERTAIN ARTICLES OF FOOD.
APPLICATION FILED JAN. 22, 1903.
NO MODEL. 3 SHEETS—SHEET 1.
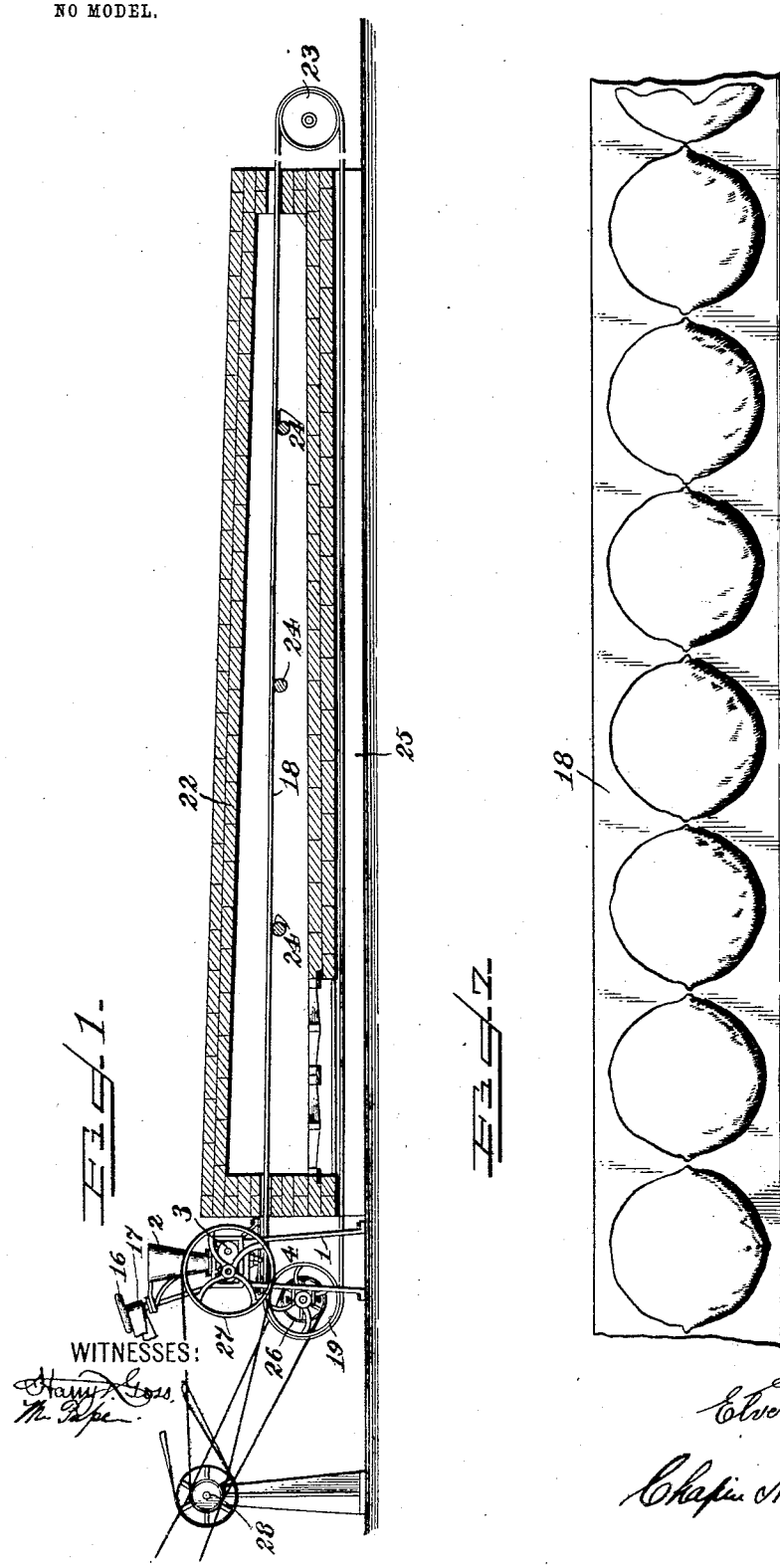
WITNESSES:
INVENTORS
Luis Romero, and
Elverando Rodriguez y Arce
BY
Chapin Hayward & Marble
their ATTORNEYS No. 738,242. PATENTED SEPT. 8, 1903.
L. ROMERO & E. RODRIGUEZ-Y-ARCE.
APPARATUS FOR PRODUCING AND PREPARING CERTAIN ARTICLES OF FOOD.
APPLICATION FILED JAN. 22, 1903.
NO MODEL. 3 SHEETS—SHEET 2.
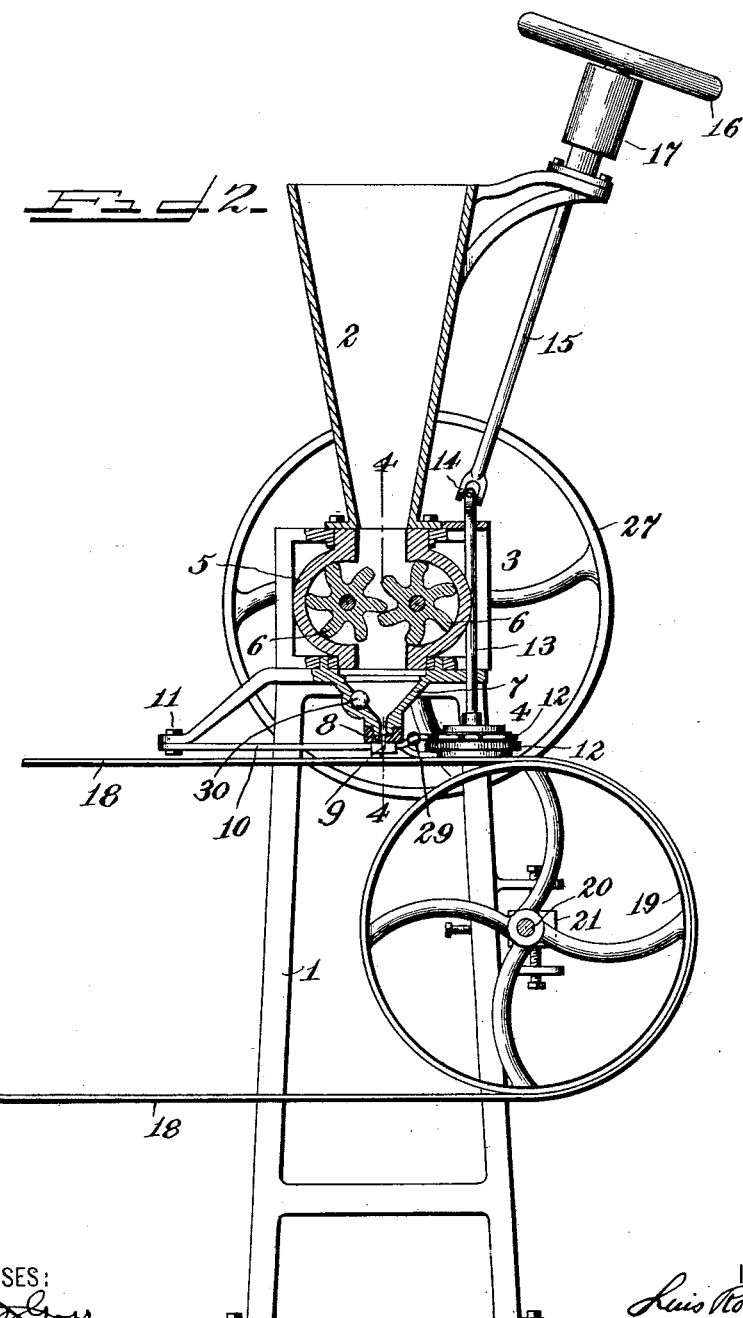

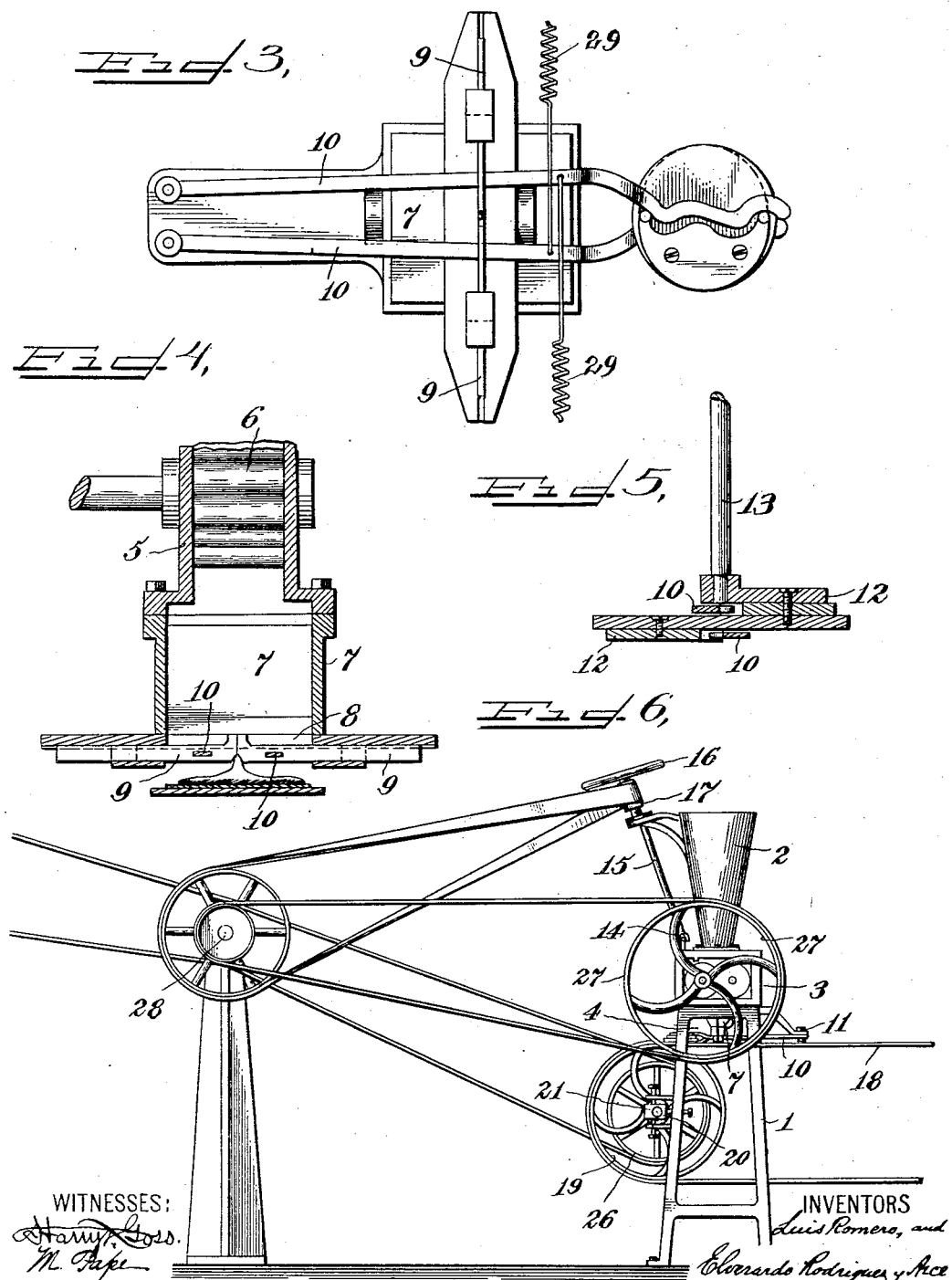

No. 738,242. Patented September 8, 1903.

UNITED STATES PATENT OFFICE.

LUIS ROMERO AND EVERARDO RODRIGUEZ-Y-ARCE, OF MEXICO, MEXICO.

APPARATUS FOR PRODUCING AND PREPARING CERTAIN ARTICLES OF FOOD.

SPECIFICATION forming part of Letters Patent No. 738,242, dated September 8, 1903.

Application filed January 22, 1903. Serial No. 140,082. (No model.)

*To all whom it may concern:*

Be it known that we, LUIS ROMERO and EVERARDO RODRIGUEZ-Y-ARCE, citizens of Mexico, and residents of the city of Mexico, Mexico, have invented certain new and useful Improvements in Apparatus for Producing and Preparing Certain Articles of Food, of which the following is a specification, reference being had to the accompanying drawings, forming a part thereof.

Our invention relates to improvements in apparatus for producing and preparing certain articles of food, and particularly to apparatus for producing and preparing tortillas.

The tortilla is a staple article of food in the Republic of Mexico and is eaten there in large quantities by all classes of people. It is particularly eaten by the laboring class, whose diet consists, by weight, of more than one-half tortillas. In fact, the diet of a large proportion of such class consists of from two-thirds to three-quarters tortillas. The tortilla is practically a griddle-cake, usually from five to six inches round and from one-sixteenth to one-eighth of an inch thick and composed of ground corn or maize. It is usually prepared by soaking Indian corn or maize in hot water with lime for a certain length of time until the grain and the hull or outside skin is softened and then grinding the grain and hull together to form a dough. A small portion of the dough is then taken between the hands, where it is rolled and kneaded into a thin flat round disk and finally patted and smoothed by the hands until it is almost polished. Lastly, it is baked upon a hot dry stone or griddle. The working of the dough in the hands, coupled with the presence of the hull or skin of the corn, causes the tortilla before it is baked to retain and practically seal up a certain amount of moisture within it, so that when the tortilla is baked the hot vapors generated from such moisture will cause the tortilla to almost separate into two very thin sheets. This condition is usually accepted by the consumer as evidence of the correct preparation and good cooking of the tortilla.

The object of our present invention is to produce by mechanical appliances an article of food closely resembling the hand-made tortilla.

We will now proceed to describe with reference to the accompanying drawings an apparatus embodying our invention in which the foregoing result may be attained, and will then point out the novel features in claims.

In the drawings, Figure 1 is a view, partly in side elevation and partly in central longitudinal section, of an apparatus embodying our invention. Fig. 2 is a view in central vertical section through the forming-machine. Fig. 3 is an under side view of certain forming mechanism employed. Fig. 4 is a view in central vertical section of certain parts of the machine illustrated in Fig. 2, the section being taken upon the plane of the line 4 4 of Fig. 2. Fig. 5 is a detail sectional view of certain cams employed for operating the forming members. Fig. 6 is a view in side elevation of the forming-machine, showing same connected by belting to a suitable drive-shaft. Fig. 7 is a detail top view of a conveyer-belt employed and a plurality of tortillas supported thereby.

The forming-machine illustrated herein comprises a suitable framework 1, a receiving-hopper 2, feeding means 3, and forming mechanism 4. The feeding means comprises a suitable casing 5, in open communication at its upper end with the hopper, and intermeshing impelling-wheels 6 arranged within same much on the style of a rotary pump. The feeding means are arranged to deliver to a receiver 7 in open communication with the lower end of the casing 5. The receiver is contracted downwardly in one direction and terminates in a discharge opening or slot 8, whose length is substantially the width of the receiver in the direction in which it is not contracted (see Fig. 4) and whose width is equal to about the thickness of the articles to be formed. (See Fig. 2.)

Forming members 9 are arranged to reciprocate toward and away from each other, with their inner ends traveling within the slot or discharge-opening 8. The said forming members 9 are suitably guided in portions secured to or forming a part of the receiver 7 and are engaged and operated by levers 10. The levers 10 are arranged transversely of the forming members and are pivoted to the framework at 11 and controlled in their movements by cams 12, mounted upon a vertical shaft 13. Springs 29, secured at one end to the framework and at the other end to the said levers, hold the levers 10 up to the face of the cams 12. The cam-shaft 13 is mounted to rotate in suitable bearings in the framework 1 and is connected by a universal joint 14 with a shaft 15, carrying a balance-wheel 16 at its upper end. The shaft 15 also carries a belt-pulley 17, by which it, and consequently the shaft 13 carrying the cams 12, may be driven.

A belt-conveyer 18 is arranged to travel beneath the discharge-opening 8 and to receive the material delivered therefrom. The said belt-conveyer 18 passes around a supporting-pulley 19, carried by a shaft 20. Said shaft is mounted to rotate in bearing-blocks 21, adjustably secured to the framework 1. As will be seen by reference to Fig. 2, the said blocks are not only adjustable outwardly, so as to increase or decrease the tension of the belt, but are also capable of vertical adjustment, so that the belt may be correctly positioned relatively to the mouth of the discharge-opening. The conveyer-belt 18 is arranged to pass through a suitable furnace 22, wherein the articles produced in the forming-machine and delivered to the said belt may be properly baked, and around an idler-pulley 23. The belt may further be supported at different points throughout its length by small idler-rollers 24. The return-runway for said belt is within a cool channel 25 beneath the furnace. The shaft 20, carrying the conveyer-belt-supporting pulley 19, is further provided with a pulley 26, by which it may be driven. The feeding mechanism 3 is also provided with a suitable drive-pulley 27.

It is essential that a correct relative rate of speed be maintained between the feeding mechanism, the forming mechanism, and the conveyer-belt, and for this purpose we have shown their respective drive-pulleys 27, 17, and 26 all connected by belts to pulleys carried by an intermediate shaft 28. Said intermediate shaft may derive its motion from any suitable source of power.

The operation is as follows: The cornmeal or dough is prepared in any suitable manner, as by grinding and mixing until it is of the right consistency, when it is fed into the hopper 2 of the forming-machine. The impelling or feeding wheels 6 will feed same forward into the receiver 7 and gradually force it out through the discharge-opening 8 and past the forming members 9. While the dough is being thus discharged, the forming members 9 will be reciprocated toward and away from each other by the cams 12. The speed of the cam-shaft is so regulated with respect to the speed of the impelling-wheels as to cause said shaft to make one complete revolution for each feeding movement sufficient to discharge an amount of dough requisite for a single tortilla or other article to be produced. The commencement of movement of the cams 12 is from a point at which the forming members 9 are in a closed position, and in order to give a cylindrical shape to the article formed the first movement of the forming members away from each other should be an exceedingly rapid one. The cams 12 and the portions of the levers 10 engaging them are therefore so shaped as to give such movement and later to give a more gradual movement until finally the formers are moved away from each other the limit of distance required, when the cams will then permit them, first, to draw together gradually, and, finally, to complete their movements very rapidly. The result of such movements of the forming members, in combination with the means for forcing the material past same, will be to produce an article of practically cylindrical form and having a thickness substantially equal to the width of the discharge-opening or slot. We have provided an air-chamber in a hollow rubber ball 30, located in a wall of the receiver 7, to relieve excess of pressure due to the momentary closing of the forming members 9 or other causes. The conveyer-belt 18, which is arranged to travel immediately beneath the discharge-opening and forming members, will be so timed in its movements as to travel just so fast as to receive and carry off the articles as they are produced, for it will be understood that were it to travel too fast it would be likely to drag the articles, composed, as they are, of soft plastic material, out of shape, and were it to travel too slowly the articles would be liable to be buckled, turned back upon themselves, and caused to overlap each other. The articles thus produced will closely resemble the hand-made articles, and for the reason that the forming mechanism will have a tendency to produce a smooth and polished surface upon the article and to compress the material at the outer surface, so that when it is baked the desired separation previously referred to will take place. The articles produced and received by the belt 18 are carried thereby into the furnace 20 and preferably into the hottest portion of said furnace first. The intense heat will cause the articles to split or separate in the desired manner, and they will continue to cook and become thoroughly baked as the conveyer-belt 18 carries them completely through the furnace. The conveyer-belt will preferably extend for some little distance beyond the furnace, so that the articles will have a chance to slightly cool before they are delivered. Suitable receptacles may be provided to receive the articles as they are delivered by the belt in passing over the idler-pulley 23.

What we claim is—

1. The combination with forming mechanism comprising a plurality of forming or shaping members, of means, operating simultaneously, for moving said members toward and away from each other and for forcing a plastic material through said members.

2. The combination with forming mechanism comprising a plurality of forming or shaping members, of means, giving a variable throw, for moving said members toward and away from each other, and means, operating simultaneously therewith, for forcing a plastic material through said members, during their movement toward and away from each other.

3. The combination with forming mechanism comprising a plurality of forming or shaping members, of cams for moving said members toward and away from each other, and means, operating simultaneously therewith, for forcing a plastic material through said members, while they are moving toward and away from each other.

4. The combination with forming mechanism comprising a plurality of forming or shaping members, of means, operating simultaneously, for moving said members toward and away from each other and for forcing a plastic material through said members, and a traveling conveyer for receiving such material and timed to carry same away from the discharge-opening while it is being discharged.

5. The combination with forming mechanism comprising a plurality of forming or shaping members, of means for moving said members toward and away from each other, and for simultaneously forcing a plastic material through said members, a conveyer for carrying the material away from said discharge-opening as it is discharged therefrom, and means for adjusting the conveyer toward and away from the mouth of the discharge-opening.

6. The combination with a receiver having a discharge-opening, of means for forcing plastic material through the discharge-opening, forming or shaping mechanism arranged adjacent to the discharge-opening, and means for operating the forming mechanism to vary the size of the discharge-opening while the plastic material is being forced therethrough.

7. The combination with a receiver having a discharge-opening, of means for forcing plastic material through the discharge-opening, forming or shaping mechanism arranged adjacent to the discharge-opening, and means, giving a variable throw, for operating the forming mechanism to vary the size of the discharge-opening while the plastic material is being forced therethrough.

8. The combination with a receiver having a discharge-opening and means for forcing plastic material through the discharge-opening, of an air-chamber for such receiver, forming or shaping mechanism arranged adjacent to the discharge-opening, and means for operating the forming or shaping mechanism to vary the size of the discharge-opening while the plastic material is being forced therethrough.

9. The combination with a receiver having a discharge-opening, means for forcing plastic material through the discharge-opening, and a hollow rubber ball containing air within said receiver, of forming or shaping mechanism arranged adjacent to the discharge-opening, and means for operating the forming or shaping mechanism to vary the size of the discharge-opening while the plastic material is being forced therethrough.

10. The combination with rotary impelling-wheels and a receiver for receiving material discharged therefrom, said receiver having a contracted discharge-opening, of forming or shaping mechanism arranged adjacent to said discharge-opening, and means for operating the forming or shaping mechanism to vary the size of the discharge-opening while the impelling-wheels are forcing the material therethrough.

11. The combination with rotary impelling-wheels and a receiver for receiving material discharged therefrom, said receiver having a contracted discharge-opening, of forming or shaping members arranged adjacent to the discharge-opening, cams, giving a variable throw, for moving said members toward and away from each other, and a balance-wheel connected to said cams.

In witness whereof we have hereunto set our hands.

LUIS ROMERO.
EVERARDO RODRIGUEZ-Y-ARCE.

Witnesses to signature of Luis Romero:
FRANK W. PRESTON,
C. F. CARRINGTON.

Witnesses to signature of Everardo Rodriguez-y-Arce:
W. A. TOPLIFF,
A. M. CAPRILES.